US 9,053,188 B2

(12) United States Patent
Bennett

(10) Patent No.: US 9,053,188 B2
(45) Date of Patent: Jun. 9, 2015

(54) WEB BROWSER ACCESSIBLE SEARCH ENGINE WITH STATISTICS GATHERING PERSISTENCE

(75) Inventor: James D. Bennett, Hroznetin (CZ)

(73) Assignee: Enpulz, LLC, Austin, TX (US)

( * ) Notice: Subject to any disclaimer, the term of this patent is extended or adjusted under 35 U.S.C. 154(b) by 568 days.

(21) Appl. No.: 12/368,980

(22) Filed: Feb. 10, 2009

(65) Prior Publication Data

US 2009/0282000 A1    Nov. 12, 2009

Related U.S. Application Data

(60) Provisional application No. 61/052,446, filed on May 12, 2008.

(51) Int. Cl.
*G06F 17/30* (2006.01)
(52) U.S. Cl.
CPC .................. *G06F 17/30867* (2013.01)
(58) Field of Classification Search
CPC ................................................. G06F 17/30867
USPC ............................................................. 707/732
See application file for complete search history.

(56) References Cited

U.S. PATENT DOCUMENTS

| 2003/0120654 | A1* | 6/2003 | Edlund et al. ..................... 707/7 |
| 2004/0151233 | A1* | 8/2004 | Lee ............................... 375/148 |
| 2005/0193269 | A1* | 9/2005 | Haswell et al. ................. 714/38 |

* cited by examiner

*Primary Examiner* — Hosain Alam
*Assistant Examiner* — Johnese Johnson
(74) *Attorney, Agent, or Firm* — Garlick & Markison; Bruce E. Garlick

(57) ABSTRACT

A search engine server interacts with a client devices and web servers to enhance the quality of search service based on statistics that are gathered by the system. The search engine server monitors the quality of service and data format (i.e. encoding needed for secured delivery) of search results or searched web pages delivered from the web servers. On the client side, the system generates page content usefulness statistics by monitoring user interaction with search results or web pages on the client device. Each of the visited web pages/links is associated with a vectoring event, and a vector event table is constructed using these vectoring events from all the visited web pages or search results. The vectoring event table from several search sessions are retrieved periodically, and used to compute/evaluate statistics for each of the web servers that host web pages.

10 Claims, 10 Drawing Sheets

WEB BROWSER ACCESSIBLE SEARCH ENGINE WITH STATISTICS GATHERING PERSISTENCE

CROSS REFERENCES TO PRIORITY APPLICATIONS

This application claims priority under 35 U.S.C. 119(e) to U.S. Provisional Application Ser. No. 61/052,446, filed May 12, 2008, which is incorporated herein by reference in its entirety for all purposes.

BACKGROUND

1. Technical Field

The present invention relates generally to a computer that performs search operations using a web browser, and more particularly, to the statistical processing that improves search operations over time.

2. Related Art

Current search engines typically do only the searching of the web pages during their operation from a network browser running on a client device. They receive search string entered by the user and retrieve the search result list of web pages containing the search string. They display the search results as a series of subsets of a search list, in an order on the client device, based on certain criteria. General criteria that is used during a search operation is whether the search string appears fully or partly on a given webpage, the number of times the search string appears in the search result, alphabetical order, etc. These subsets of search results are moved through and viewed through the use of "Next" or "Previous" button operations that are enabled in the search engine window. Further, the user can decide to open a link by clicking on the mouse button to open and browse. The subsequent browse operation is not monitored by any entity or module built either into the network browser or the search engine.

The search result pages contain only their contents and no metadata. This minimum set of data will not help in any way to enhance the quality of the search operation. The quality of the search operation relates to the relevance of the search list from the viewpoint of user's interest, the way the results are ordered and displayed, the response of the web servers upon a page request, the quality of the web pages hosted on a web server, etc. A better search service requires certain efficient criterion for their constant monitor, one way of measuring them, and a method of using this data to improve searches. Such processing does not exist in the art today.

Search engines opened in a network browser, are not capable of sensing, user's interactions. The user's interaction parameters (or events) become one of the components of vital information required by the search engine for enhancing the quality of the search results and hence the search service. Current search engines lack the essential content/interaction/features of intelligence or sensing, and lack a monitoring module built into them for quantifying the user's interaction events with search results.

Further, current search engines, do not gather and maintain any information or statistics regarding the browsed web pages from either the client device on which the webpage is opened or the web servers hosting them. Current search engines do not have any special modules built into them, which can assist them in doing these operations. The search engine database is merely passively provide the search result list, based on the search string provided by users from the respective client terminals, without any additional gathered statistics or monitoring.

When there is no means of measuring or monitoring the search efficiency of a search session, it becomes impossible to compute any statistics related to the search efficiency that can later be used to improve search result quality. Thus, it is impossible to improve the overall performance of the Internet in terms of the search throughput, quality of searchable content, and/or the speed of searches. As a result web server quality in terms of its hosted pages, speed of response, etc., cannot be enhanced, as proper statistics are not collected, used, or computed.

Further limitations and disadvantages of conventional and traditional approaches will become apparent to one of ordinary skill in the art through comparison of such systems with the embodiments taught herein.

BRIEF SUMMARY OF THE INVENTION

The present invention is directed to apparatus and methods of operation that are further described in the following Brief Description of the Drawings, the Detailed Description of the Invention, and the claims. Other features and advantages of the present invention will become apparent from the following detailed description of the invention made with reference to the accompanying drawings.

DETAILED DESCRIPTION OF THE DRAWINGS

Figure 1:
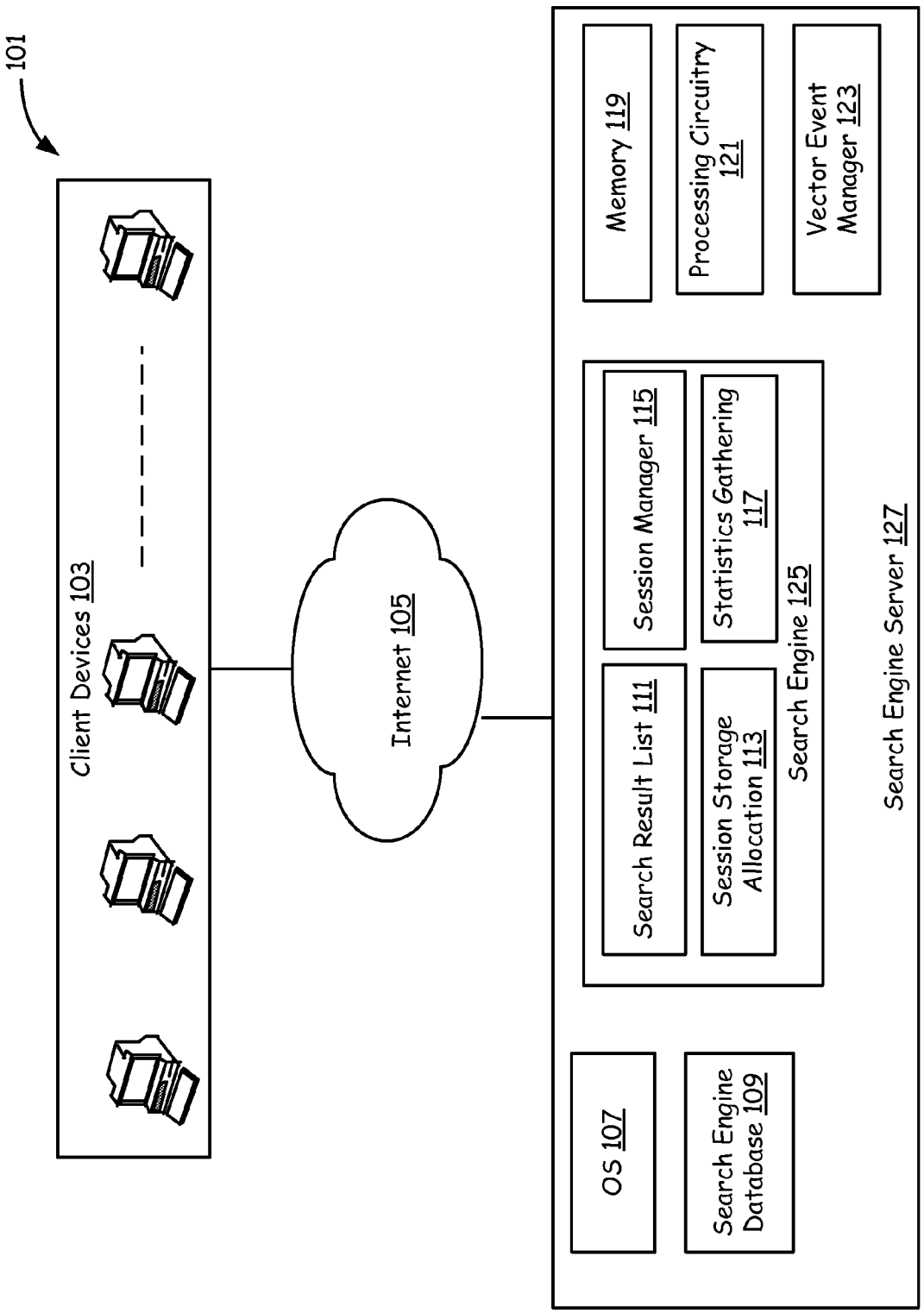
FIG. 1 is a system block diagram illustrating the search engine supporting the gathering of statistics and its persistence.

The system taught herein is a computer or computer system having a search engine supporting statistics gathering persistence. Each time a user selects or creates a search string and enters it into the search engine, the search engine assembles all the search result pages corresponding thereto. The search engine then gathers page usefulness statistics from the user's interaction with every page that the user opens and browses within the search results. In other words, page or search result usefulness statistics are gathered for every subset of the search result/links/pages selected by a mouse click between "Next" or "Previous" buttons. The gathered page usefulness statistics will be communicated to the search engine server, at the end of browsing each page or at some other interval determined by the user or the system. The closing of each page is marked by "backward" or "forward" arrowing on the network browser and the clicking of the mouse on the "Next" or "Previous" buttons on the search engine page.

A page usefulness monitor module from the network browser hands over the page usefulness statistics to a module called herein a "session manager" usually within or associated with the search engine. The collected page usefulness statistics will be considered as an "event," and will be stored as a "vector event" associated with the corresponding link or interaction with a search result. This "vector event" will be stored as a "vector event" entry in a table called a "session vector event table" herein. The event is considered as a "vector event" entry when it gets associated with the corresponding link (URL). This URL is the link that vectors, associates, or directs that event in conjunction with a page or search result on the corresponding web server on the Internet. In one embodiment, the vector events are also stored on the web server rather than the client (or they are stored on the server in addition to the client). In one embodiment, the vector events are stored along with the corresponding webpage, a copy of which or pointer thereto may also stored in the search engine database.

A search session is the entire search duration, between when a user starts search engine and does the searching until the user finally closes the search engine or terminates that search. The duration marked between these two main events is full of user's interaction with the search result pages, generating a number of other vector events. Those events, for example, include the user-browsed links/web pages, dwell time on each page, selected items on a page, number of links followed on a webpage, a user's response in the form of opinion or page rating through windows options, etc. All the links associated with their events are gathered by a search engine module called the "page usefulness statistics gathering module," in accordance with one embodiment.

The page usefulness statistics are communicated by the page usefulness statistics-gathering module to a session manager. The session manager assembles the link(s) and the corresponding page usefulness statistics, thereby generating the completed or more-competed vector events. All the vector events corresponding to a search session are assembled into a "session vector event table" by the session manager, and stored in the search engine database. In one embodiment, vector event information is attributed to the webpage or search result and communicated back to the web server. This attributed information will become available to subsequent search sessions and processes.

The vector event table generated by the session manager eventually contains all the session event information and can provide a more useful analysis of the performance and the quality of the service related to one or a plurality of the web servers available on the Internet. The insight provided by the session manager is further utilized to enhance the network speed performance, quality of Internet access, quality of searching, quality of provided search content, etc., by compiling the session vector event table information via a module called a "vector event manager." The vector event manager receives all the gathered vector event table information from different search sessions, maybe across many different users/searches/systems, and periodically compiles the performance statistics of the web servers or any other source of web contents available on the Internet. The estimated performance statistics enables the web server administrators (or artificial intelligence on the systems themselves) to work to enhance the quality and the performance of their sites on some periodic or ongoing basis.

Figure 2:
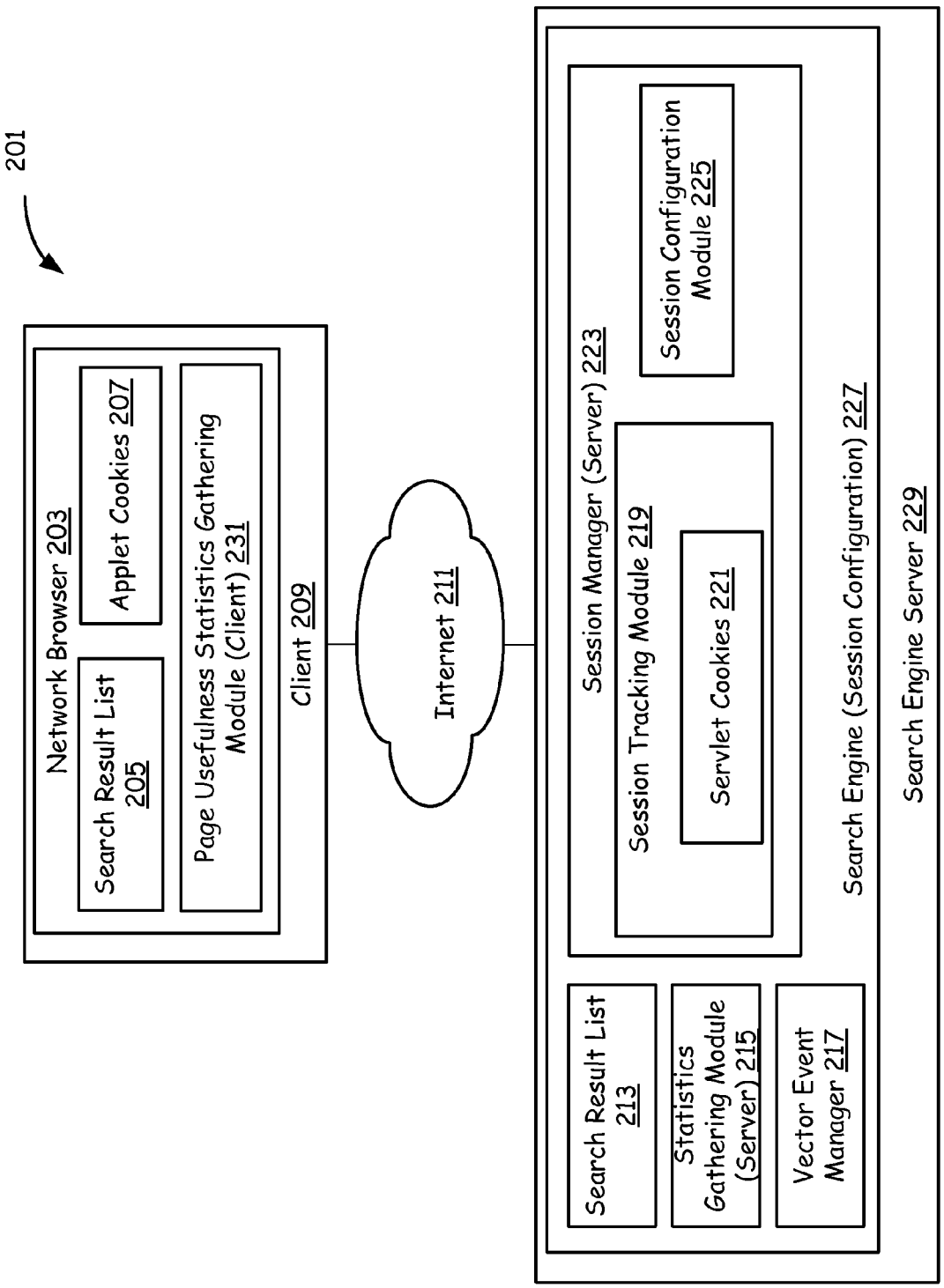
FIG. 2 is a system block diagram of a search engine server that gathers persistence data related to search activities initiated by a network browser employing a session manager and a tracking module, in accordance with one embodiment.

A search engine with statistics gathering persistence is implemented with additional functional modules within or associated with an existing search engine. Essential modules that support statistics gathering persistence are the, page usefulness gathering module, session manager, and vector event manager, as discussed herein in greater detail. The session manager contains session tracking module, and search engine session configuration module (connected together as shown in FIG. 2 and shown in more specific individual detail in FIGS. 3-4). In one embodiment, cookies running on the search engine server (served cookies) can support the enhanced functionalities of a session manager.

The page usefulness gathering module (often client side, but sometimes located server side in other embodiments) is a search engine module that monitors the user interaction with webpage or search results. It communicates the user's interaction with a webpage or search results in the form of "page usefulness statistics" to the session manager (usually located server side, but may be located on the client side in other embodiments). In one of the embodiments, the page usefulness gathering module is a part of the network browser. In another embodiment, this function can also be supported by running applet cookies on the client machine during the search session. This approach works if the cookies are enabled on the client machine or an associated machine. In yet another embodiment, this functionality can be made available permanently by a browsers or an operating system (OS) of a client or other device within the system.

The session manager (see FIG. 2) is a search engine module running on the search engine server in most cases. Two components of this module are the session configuration module and Session tracking module (shown in more detail in FIGS. 3-4 respectively). In one embodiment, the functionality of the session manager may also be supported by the search engine server based cookies (servlet cookies).

A session configuration module of the session manager helps in configuring the session search resources optimally to the needs of the user, otherwise, a default configuration will be assumed. Important blocks that come under the session configuration module are the load balancer, resource allocation monitor for a session, etc. (see FIG. 3). A session tracking module (see FIG. 4) of the session manager does the function of receiving the session request, tracking the occupation and release of the resources, clearing the garbage (heap size setting) of orphaned sessions, gathering the web server related statistics, generating the session vector event table, etc.

A vector event manager of the search engine (see FIG. 1), periodically retrieves the session vector event tables from the search engine database, and then compiles and computes the performance statistics of a plurality of the search sessions. This computation maintains the performance related database, and this data is shared with the web servers. This statistical information can be used to enhance the performance of the web servers and other Internet resources, helping in the optimum utilization of valued Internet or server infrastructure.

Now referring to FIG. 1, which is a block diagram 101, a search engine 127 is illustrated where this search engine 127 supports the statistics gathering persistence discussed above. A plurality of client devices 103 is communicatively coupled with the search engine server 127 using the Internet infrastructure 105. Each of the client devices running a network browser supports the search engine, to facilitate the gathering of the session statistics. The search engine can be either client side or may be located server side in the event that the clients are "dumb terminals" or less capable machines that rely more heavily on the server for functional support.

The search engine server 127 is resident on a computer and contains a search engine 125, and an instance of search engine is launched on several clients 103 simultaneously. Illustrated components of search engine server are the, search engine tool 125, vectoring event manager 123, search engine database 109, operating system (OS) 107 (that supports efficient searching operation), processing circuitry 121 (powerful enough to process large amount search result data, e.g., a CPU, DSP, MCU, or other computing integrated circuit or system), memory module (hard drives, random access memory, cache, memory arrays, and the like) 119. The search engine 127 has a copy of the search result list 111 that is eventually displayed on the client device, and provides options to configure storage size during the session. The engine 127 also contains the session storage allocation 113, session manager 115, and the statistics gathering 117 pertaining to the pages browsed. Each of the detailed blocks from this figure is further explained in detail in the subsequent figures.

FIG. 2 is a system block diagram illustrating the components of a search engine session manager 223, coordinating with the network browser modules 203 for statistics gathering persistence, in accordance with one embodiment. In response to entering of the search string, the search engine 229 generates or assembles a search result list by performing the search operation over the entire Internet, an intranet, or some portion thereof. Upon opening and browsing search results and/or web pages by the user, the page usefulness statistics gathering module 215 gathers the page usefulness statistics, and communicates to the session manager 223 on the search engine server 229. The session manager merges the page usefulness statistics from the current session with that retrieved from the previous session(s) (stored in the search engine database/memory), and updates the vector event table and the search engine database with the resultant new session statistics. The vector event table, search engine database, etc., are often stored in memory 119 of FIG. 1 or some other memory located within the system.

Session tracking module 219 and the session configuration modules 225 are two components of the session manager 223. In one embodiment, the search engine server side session tracking function is performed by servlet cookies 221, a simplest implementation of the session tracking. Other methods of enabling this functionality are possible. The cookie approach often works only if the cookies are enabled by a user on the client. The statistics gathering modules 215 that form a part of the search engine retrieve the web server related statistics during the search session, which also forms the part of the resultant search session statistics stored in the vector event table, according to one embodiment.

Components of a search engine session manager 223 coordinate with the components of network browser module 203 for statistics gathering persistence, in accordance with one embodiment. The network browser 203 is running on a client device 209 on which the search result list 205 is displayed when eventually sent or messaged from server 229 in response to a search entered by the user during a search session. Within the client 209, the page usefulness statistics gathering module 231 does the gathering of the page usefulness statistics during the browse operation, and communicates via the Internet 211 to the search engine session manager 223.

The search engine session manager 223 contained in the search engine server 227 comprises the session tracking module 219 and session configuration module 225. According to one embodiment, the servlet cookies 221 perform the session tracking operation, if the cookies are enabled. The search engine server retains a copy of the search results list 213. The statistics gathering module 215 on the search engine, does the statistics gathering from the web server, merges information with the page usefulness statistics and the resultant statistics will be appended to the previous session statistics, in the vector event table. The vectoring event manager 217 compiles the vector event tables resulting from several search session to compute the statistics related to the search performance.

Figure 3:
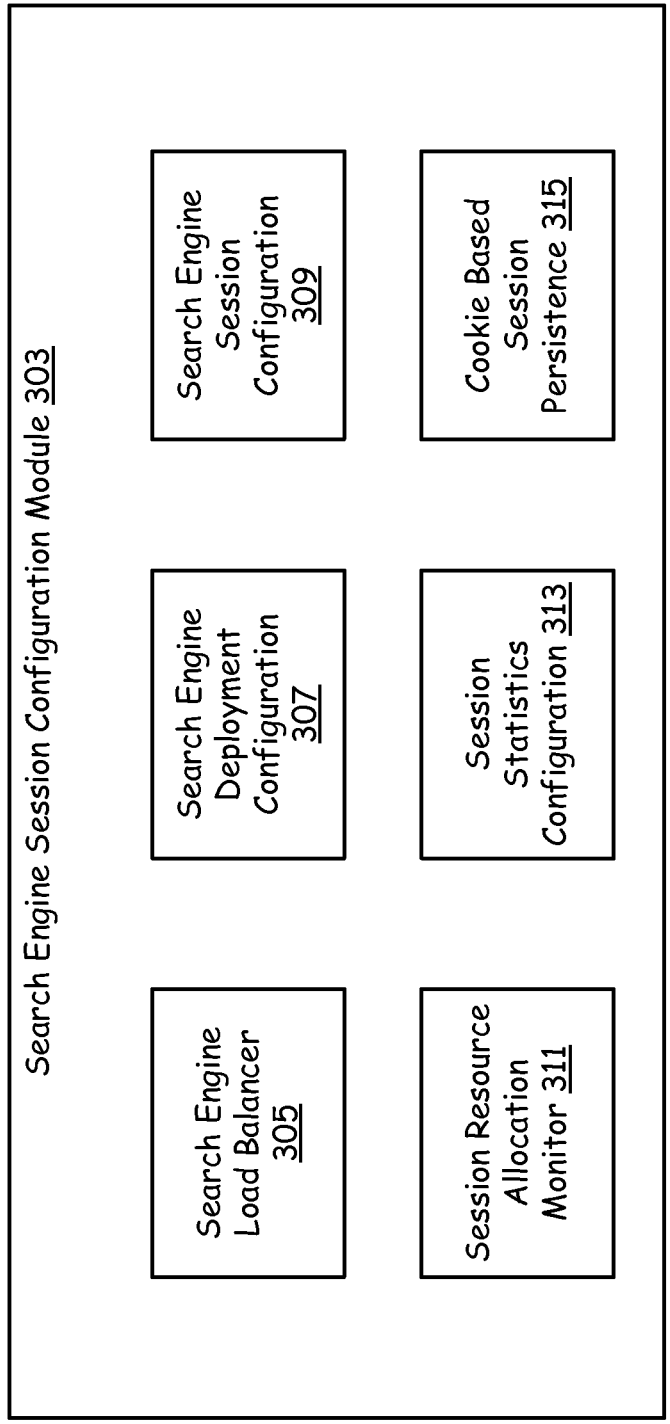
FIG. 3 is a block diagram illustrating, the essential components of a session configuration module of a search engine server as it implements statistics gathering and persistence, in accordance with one embodiment.

FIG. 3 is a block diagram illustrating the components of a session configuration module 225 (See FIG. 2) in more detail. The module 225, illustrated as module 303 in FIG. 3, implements the statistics gathering persistence feature into a search engine, in accordance with one embodiment. This module 303 consists of a load balancer 305, a session resource allocation monitor 311, a search engine deployment configuration module 307, a search engine session configuration module 309, a session statistics configuration module 313, and cookies based session persistence module 315. These modules may be implemented in hardware and/or software within a system 301 that are part of the system illustrated in FIG. 2.

A search engine server is a common resource to be shared among many users across the entire Internet. The computing, memory, etc., resources are to be shared without blocking the task of other clients, indefinitely. Just one user occupying the whole search engine server resource all the time or for all search operations will jeopardize the very purpose of search operations on the Internet or any system. The function of the load balancer 305 is to allocate computational resources, equally on a time-shared basis, among several simultaneous search sessions by many users across the entire Internet.

The launching of the search engine on a search engine server for search operations requires a right setup of the search engine. The setting up of the search engine, for example, setting up a number simultaneous logins, the time slice per session, etc., is initially done by the system administrator. All the setup information will be stored in a file called search engine deployment configuration module 307. Search engine session configuration module 309 describes the session related configuration that a user can describe. The session settings will either be lost at the end of a given session or they may persist or be stored in memory associated with the network browser configuration 301 for some time thereafter.

A session resource allocation monitor 311 sets the settings related to the definition of resource allocation. This includes the, CPU time slice, memory used per session, etc. Another unit of the session configuration module 303 is the session statistics configuration module 313, which has all the definitions of the statistical parameters of the system, including gathered search statistics, time interval between two gatherings events, etc.

The cookie based search session monitoring module 315 is a simple and direct approach of session monitoring. In an embodiment according to the present invention, cookies can be launched on both the server and the client. The client-based cookies collect information related to the page usefulness statistics, while the cookies that run on the server functions to do statistics data management, as explained earlier.

A search engine session configuration module 303 implements the statistics gathering persistence feature into a search engine, in accordance with one embodiment. The search engine session configuration module 303 performs the function of setting the session configuration to create an effective search operation environment.

The search engine load balancer 305 assigns search tasks equally or based on some load-balancing algorithm on all the processors (comprised of the processing circuitry 121 of FIG. 1) of the search engine server. It does this task by round-robin scheduling of the simultaneous search tasks requested by the different users or by some other resource allocation and balancing process, such as semaphore assignment, last in first out (LIFO) availability, etc. The search engine deployment configuration 307, describes the configuration of the launched search engine for the search operations. The search engine session configuration module 309 supports the customization of the search session, by the user. The current session settings are valid only for that session. Thus a new user logged on to the same client can customize his session instead of using a default setting. The resource allocation monitor 311 performs the function of allocating the resources to the current search task. It is the duty of the module 311 to track and retrieve all the resources before, during, and/or after a particular search operation. Module 311 appropriately flags the availability of the resources, so that the new session can utilize them later. The session statistics configuration 313 defines all the search session parameters that are monitored from either the client or on the search engine server. New search parameters can be added and defined, so that the search parameter space can expand.

In one embodiment, cookie based session persistence module 315 helps in monitoring and gathering of the search statistics from either the client device or from the search engine server itself. The cookies are launched and sent or enabled by the server to the client; it is the discretion of the user to accept cookies to support the statistics gathering from search session. If the cookies are not enabled, the client will not be able share the search session statistics with the search engine server.

Figure 4:
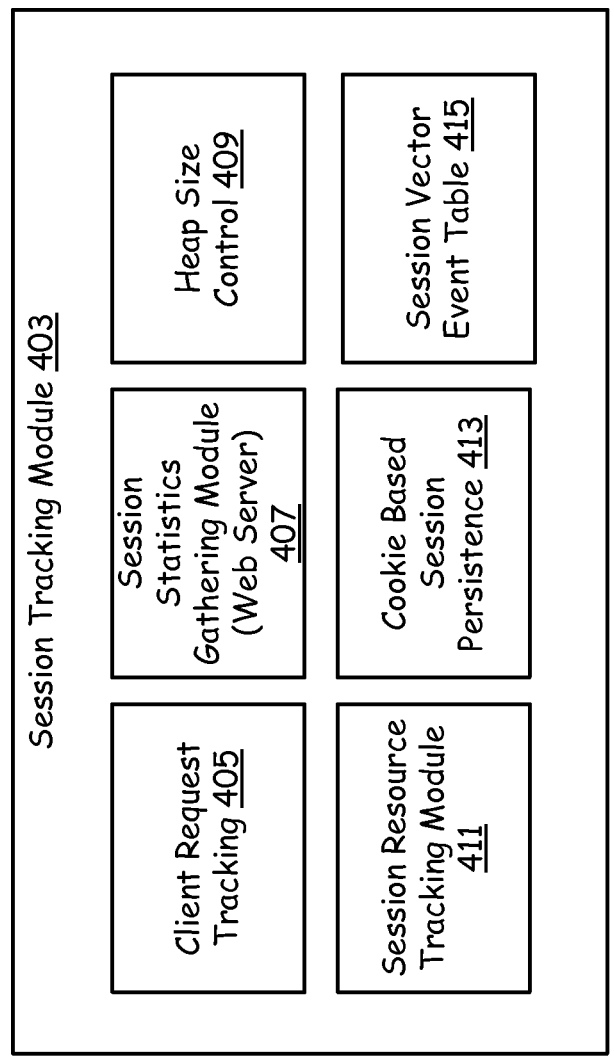
FIG. 4 is a block diagram illustrating the essential components of a session tracking module, which tracks the events that occur during a search session, in accordance with one embodiment.

FIG. 4 illustrates the session tracking module 219 of FIG. 2 in greater detail. FIG. 4 is a block diagram illustrating, the components of a session tracking module 403 which tracks the events that are occurring during a search session, in accordance with one embodiment of the present invention. The users browsing data from the client terminal enters the search string and does the search request for web pages or search results containing the search string words or correlations thereto. The request made from several clients are received and processed by a client request-tracking module 405. Upon finding and retrieving the search result pages, they are communicated to be displayed on the respective clients.

The search engine also gathers search statistics from the other different origins, for example the web server events. It also needs to retrieve the session statistics from the previous search session corresponding to a webpage. A session statistics gathering module 407 built into a session tracking module 403 performs this function.

The session tracking module 403 also needs to monitor the sessions that abruptly end or are killed in process, where these search sessions are called orphaned sessions. Any resources that are allocated to such aborted session(s) need to be recovered by analyzing and cleaning the garbage data, orphaned resources, etc. This function what is called heap size control (referring to the memory occupied by such session) and is managed by heap size control module 409.

The session resource-tracking module 403 keeps track of the assigned resources to each search session; retrieves them after session completion, and re-assigns them to new waiting sessions. In this process, module 411 maintains a resource allocation table, and keeps updating it after every allocation and reallocation process. The availability of resources is indicated through setting up of an appropriate flag, so that new sessions can readily determine or identify available resources.

According to one embodiment, launching cookies, tracking their lifetime, and managing their functionality is performed by cookie based session persistence module 413. It is it's the responsibility of module 413 to track whether the cookies are allowed on a particular client, or not. Appropriate messages are displayed to the user during the search session, so that the user can be informed of and select the alternate configurations available on the system (if any).

Session statistics gathered from the different origins or searches are assembled together during search sessions and stored in a table called a vector event table 415. The merger of the session statistics together to form the current session statistics is performed by a session vector event table module 415. The assembled vector event table for a session will be finally stored in the search engine database on the server or a related system, and also the events pertaining to a page are attributed to the corresponding webpage and communicated back to the web server, so that it can also store the webpage metadata derived during several sessions of reference made on that webpage.

Components of the session tracking module 403 track events that are occurring during a search session, in accordance with one embodiment. The session tracking module 403 contains client request tracking module 405, for tracking the client requests for the search sessions. The session statistics module 407 gathers the search statistics derived from the different origin or search. The heap size control 409 controls the session garbage clearance and helps in achieving the optimum search engine performance. The session resource-tracking module 411, keeps account of the available and occupied resources for searches.

In one embodiment, the cookie based session management module 413 manages the coordination between the applet cookies and the servlet cookies for achieving the gathering of the session statistics information. The session vector event table 415 is the result of the assembling of the various components of the session statistics.

Figure 5:
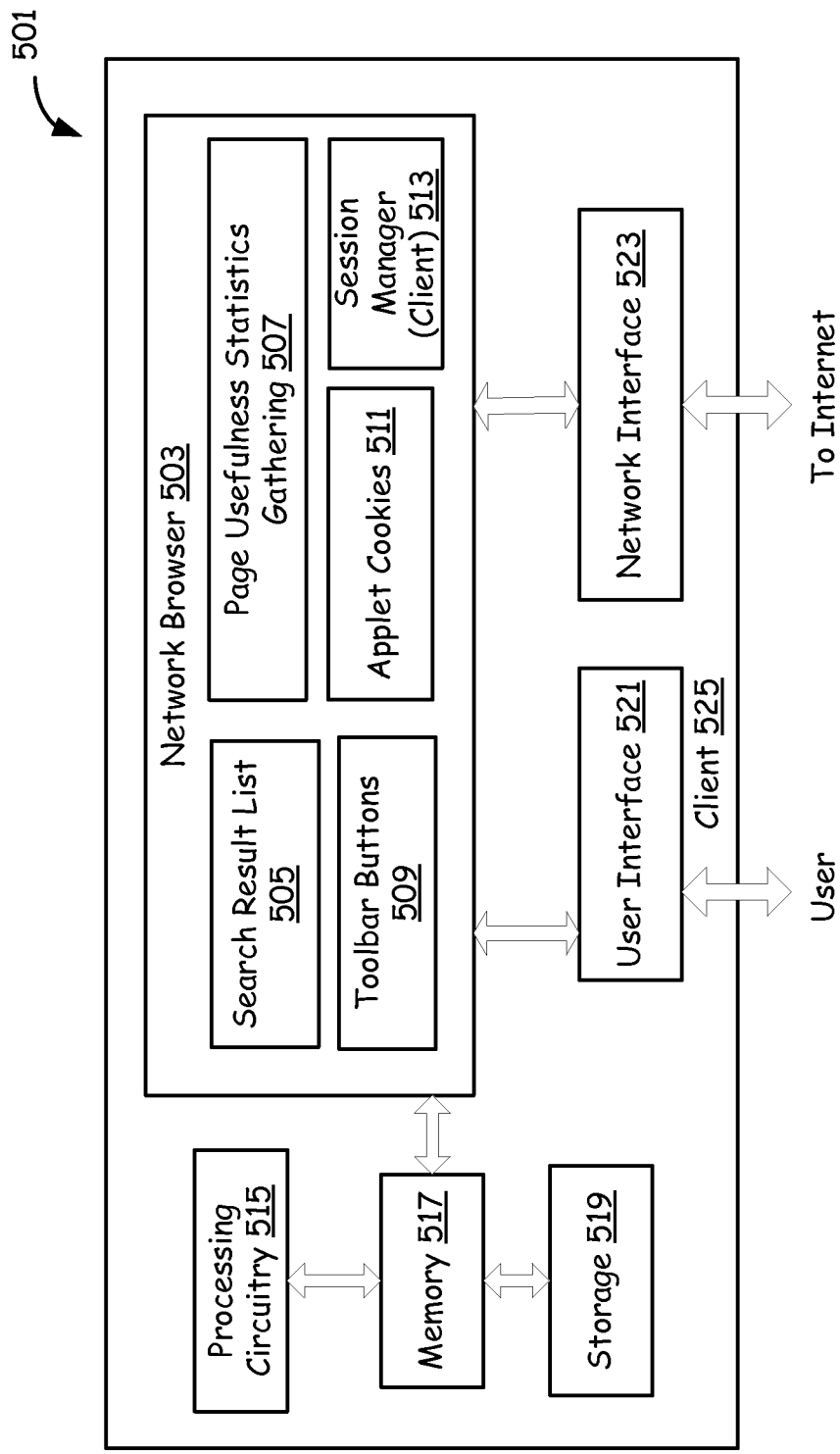
FIG. 5 is a block diagram illustrating the essential components of a network browser that interacts with a search engine capable of statistics gathering and persistence, in accordance with one embodiment.

FIG. 5 is a functional block diagram illustrating the components of a network browser supporting the search engine for statistics gathering. In accordance with one embodiment, this system 501 is part of the client device 525 (similar to client devices illustrated in FIGS. 1 and 2). The components of FIG. 5 are shown in one specific interconnection, but other connection options exist between the elements illustrated in FIG. 5. The client device 525 provides the necessary user interface 521 to the user and the network interface 523 essential for the client to communicate with other devices on the Internet via wired, wireless, optical, or other methods. The network browser 503 that runs on the client device 525 supports the search engine by providing a mechanism to gather page usefulness statistics (see upcoming FIG. 6 for page usefulness statistics methods). According to one embodiment, the mechanism by which the system supports a search engine is by providing the user with additional pop up windows, so that user can explicitly enter page ratings on a number scale or in the form of some adjectives such as high, low, medium, etc. Some of the toolbar buttons or dropdown menus in the network browser will also assist users by direct and simple way of evaluating the webpage. The page ratings, input by a user or tracked by or for the search engine, are used to indicate the desirability of a page or search result to the end user. Search results or pages that are ranked one way (e.g., high ranking) are deemed to be highly desired by a search or the user performing the search, whereas search results or pages that are ranked another way (e.g., a low ranking) are undesired or not useful to the end user performing the search.

The page usefulness statistics gathering module 507 functions by monitoring user's interaction with search results or web pages with the page monitor. In one embodiment, this monitor 507 is a part of search engine and in another embodiment the monitor 507 can be part of the network browser. In both of these cases the function is to gather page usefulness statistics to allow the system to determine what search results are useful to a user and what search results are not useful to a user, and gradients therebetween. If the user permits the cookies, they assist in capturing and communicating user's interactions and his specific interest to the web server or to the search engine server. In one embodiment, a session manager 513 will be part of the network browser, which assembles various forms of sessions, determines the session statistics, and builds the vector event table.

The components of the network browser 503 support a search engine by performing statistics gathering, in accordance with one embodiment. The search engine is opened in the network browser 503, and the search string is entered. In response to this entry, the search engine generates or finds the search results list 505 and eventually displays or transmits information related thereto to the search engine window or a device that controls displaying of information on the client device(s). The user opens a page of his/her interest and starts browsing. Opening a webpage triggers the page usefulness monitor 507, so that it automatically starts gathering the user interaction parameter values.

The network browser consists of toolbar button 509 that provides shortcut for entering the user interaction information. The page usefulness statistics gathering module 507 is another component that is built into either the search engine instance or the network browser for automatic gathering of the user interaction parameters resulting in the page usefulness statistics. In one embodiment, the session manager 513 is built into the client device. The manager 513 runs on client 525 and generates the session statistics and the vector event table that will be communicated to the search engine server 127 from many client devices 103 (see FIG. 1).

In one embodiment, client generated cookies 511 gathers information from the browsed pages. These cookies are modified to serve the purpose of gathering the page usefulness statistics. This technique is simple and direct approach in gathering useful metadata for the browsed web pages. The user should allow cookies to run on the server for this technique to work, unless another approach is used that does not require cookies. Cookies will not be a big burden for the user in some embodiments, but sometimes cookies can present a performance or security risk, so care should be taken. Other supporting modules that are part of the client or the network browser are the processing circuitry 515, memory 517, user interface 521, and the network interface 523. The client devices taught herein can be smart devices, dumb terminals, hand held devices, smart phones, laptops, other servers, workstations, desktops, embedded or industrial computing devices, or other computing devices.

Figure 6:
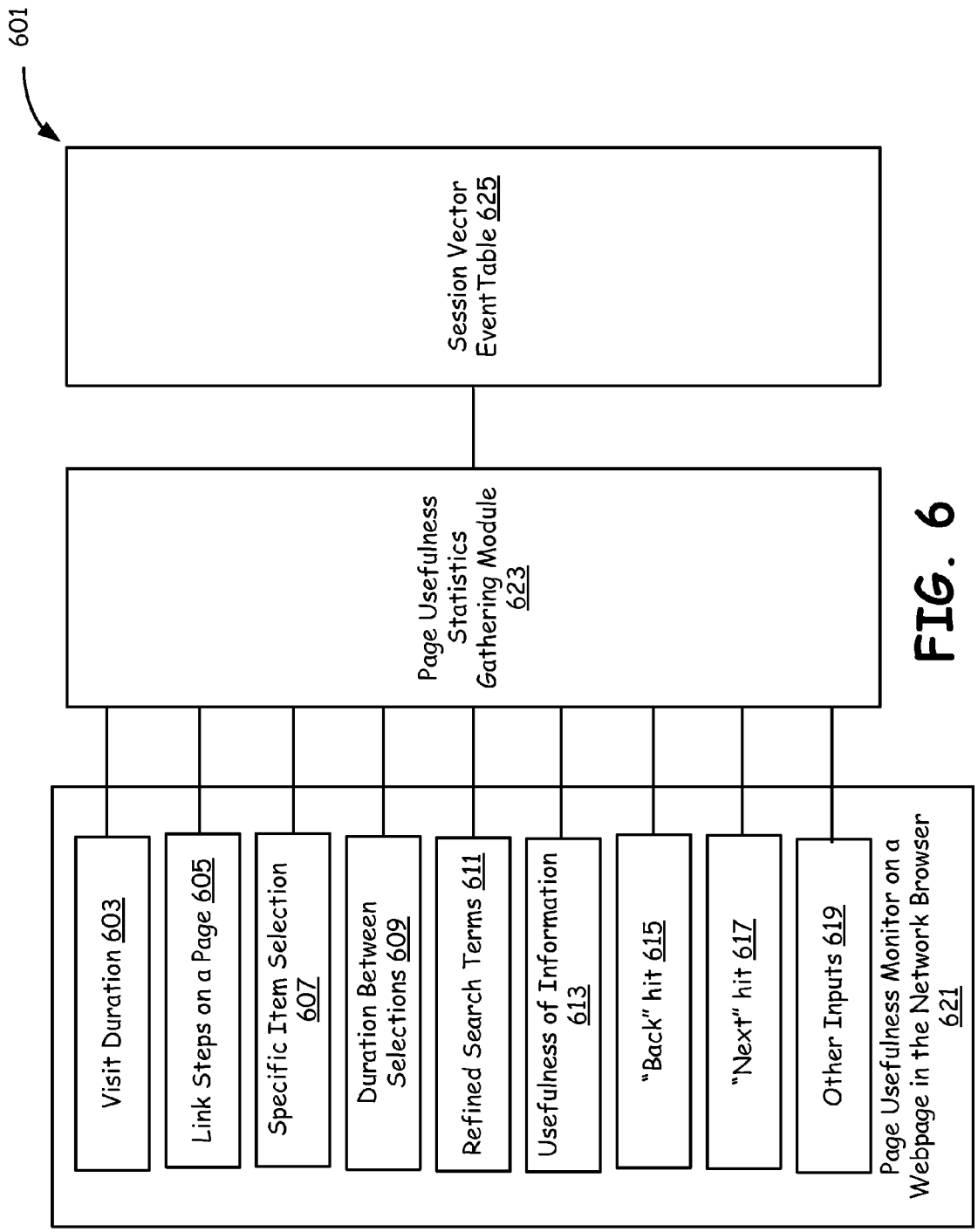
FIG. 6 is a system block diagram illustrating the real time gathering of the page usefulness statistics from a search engine instance on a client device, in accordance with one embodiment.

FIG. 6 is a functional block diagram 601 illustrating the real time gathering of the page usefulness statistics from a search engine instance on a client device, in accordance with one embodiment of the present invention. In most embodiments, the usefulness monitoring is performed client side, although it can be performed server side in the case of dumb terminals as client devices. In addition, usefulness calculations based on usefulness monitoring of user activity can be performed client side and/or server side. Sensing of the user's interaction with an opened webpage in the client devices allows for creation of the page usefulness statistics. Some of important user's interaction parameters that determine page usefulness are visit duration, link steps on a page, items selected on the page, duration between the selections, etc. All these parameters are constantly monitored or measured and communicated to the page usefulness statistics-gathering module 623 that does formatting of the parameter values suitable to store them in the Vector Event Table 625. The user's interaction parameter space can be expanded by new definitions of the parameters and proper method of picking or probing its values. The user can change the search string any time and perform new searches to repeat the entire search operation.

The user can use various network browser features such as "backward" arrow and "forward" arrows during the browsing operation for a quick searching of the required information across the entire search result list for their search operation. The frequency of hitting these keys or button on the network browser is a measure of the user's interest in certain search results. More frequently the user hits these buttons, indicates less satisfied with the browsed web pages or links. There are other categories of page usefulness parameters, which for example are explicit entries made by the user through popup windows. In one embodiment, the network browser or the search engine instance will offer the display (by a mouse selection), the previous session metadata pertaining to a webpage under consideration. This feature helps the current user to know the complete accumulated previous session's statistics. Based on this, a user can judge the quality and contents of the webpage in generating more meaningful page usefulness statistics. A search online help feature will provide help on using the popup windows for furnishing the right format of the page usefulness statistics.

A page usefulness statistics-gathering module 623 gathers page usefulness statistics from a search engine of a client device in accordance with one embodiment of the present invention. A page usefulness monitor 621 automatically and periodically samples the user's interaction parameters such as visit duration 603, Link steps or depth on a page 605, specific item selection on the page 607, duration between selections 609, refined search terms 611, usefulness of information 613, "backward" or "forward" arrowing 615 and 617, and other (user explicit) inputs (through popup windows) 619. The number of user's interaction parameters described herein is exemplary, and is not the limitation; rather this number and definitions of new parameters can be expanded based on the context. In essence, the system monitors user activity, operations, and interaction with presented search results or web pages. This monitoring allows the system to determine and track many different data points and characteristics of the user's interaction with the search results or web pages. This information can then be used to infer or calculate the usefulness or desirability of certain search results or searched web pages to the user. This information can be used to improve the quality of the user search experience, reduce search time, and generally improve the performance and efficiency of Internet server resources and expenditure.

Figure 7:
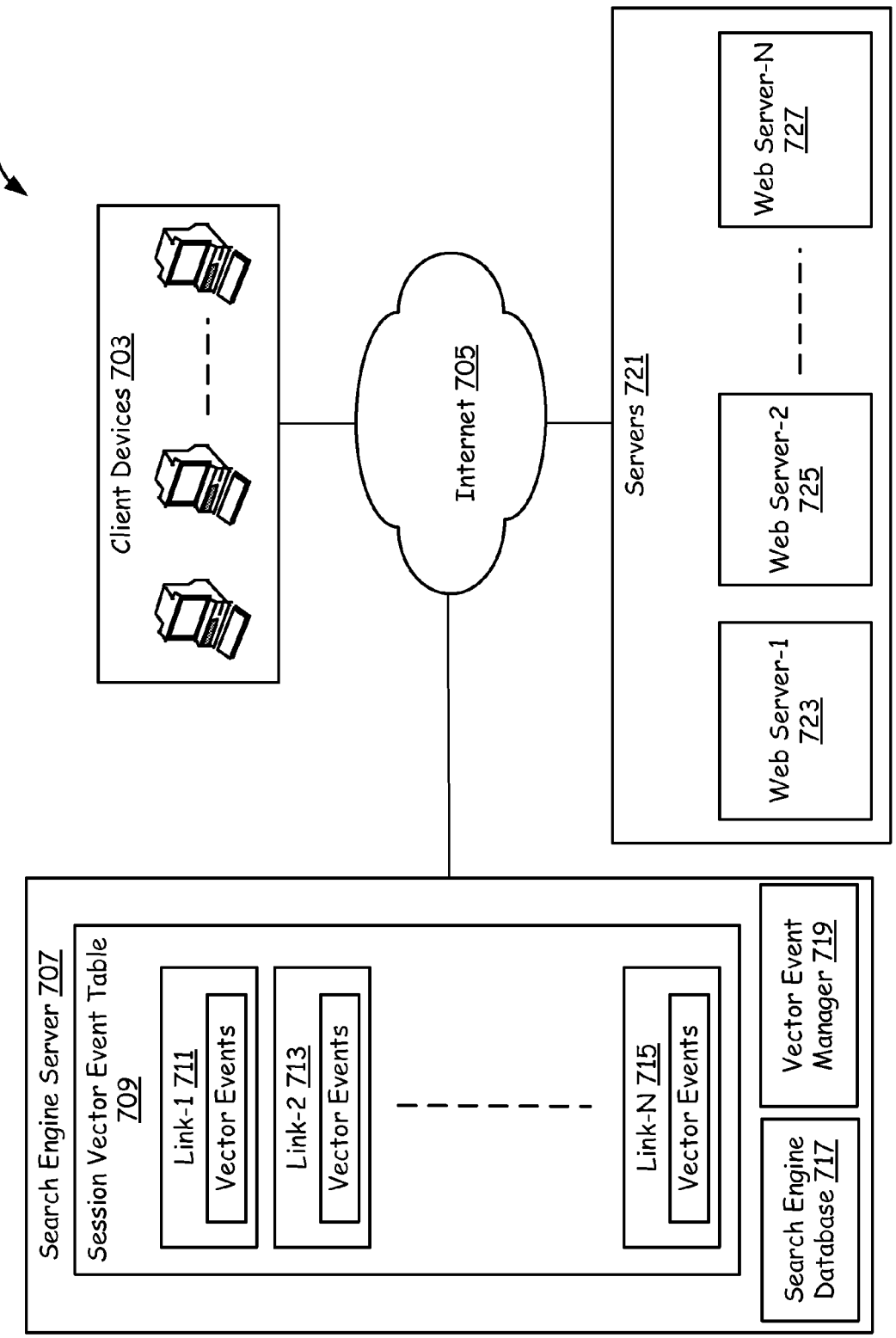
FIG. 7 is a system block diagram illustrating the vectoring of events during a search and browse session on a client device to generate a session vector event table, finally stored in the search engine database.

FIG. 7 is a block diagram illustrating the vectoring of events during a search and browse session on a client device that generates session vector event table(s) that are finally stored in the search engine database. In accordance with one embodiment, the term "event" refers to a set of different user interaction parameter values sampled at regular interval of time when the user is browsing through a webpage, finally taking a snapshot of those values of the parameters, at closure of that webpage, and communicated to the session manager of the search engine. The session manager module assembles the session parameter values and/or usefulness info with that of the page links or search result identifiers, and the resultant information is called a vector event. The event corresponds to a link or specific set of data on a specific web server on the Internet.

Thus, a multitude of "events" are systematically connected or associated with their respective web pages that arise from different web servers. A search session is the duration between the beginning and the end of a search session. A vector event table is the assemblage of several vector events in the order of their occurrences during a search session. There are a large number of concurrent search sessions by users on different client devices across the entire Internet. It is the function of the vector event manager to track all the concurrent sessions and generate the session vector event table for all of them. Concurrent sessions are created by the plurality of the client devices communicating sporadically and/or randomly with a plurality of the web servers across the entire Internet to do searches.

The vectoring of events during a search and browse session on a client device generates a session vector event table that is stored in the search engine database. A plurality of the client devices 703 are communicatively coupled to the Internet 705, which is in turn communicatively coupled to a plurality of servers 721. In accordance with the present invention, the server 721 comprises a plurality of web server-1, 723 to web server-N, 727. The search engine server 707 is shown to be an independent entity separate from other servers 721, for the purpose of understanding the concept of the present invention. However, the server 707 may be part of one or more of the servers in server farm 721 or may be part of many different servers across the Internet.

The search engine server 707 has a session vector event table 709 generated by the component modules of the session manager 223 of FIG. 2. A plurality of links from Link-1, 711 to Link-N, 715 are a series of links a user followed during a search session; each link resulting in user interaction/interest events and these were associated with the respective links becoming vector events. This session vector event table is an index of events that a user or server can follow to retrace the session statistics pertaining to a webpage, search operation, or a specific search result. This table will be stored in the search engine database 717, (which is also database 109 of FIG. 1).

The vector event manager 719 periodically compiles the search engine database comprising a plurality of the vector event tables (similar to table 709) for all the concurrent sessions in order of their occurrence. The result of the compilation is the estimation of the statistical parameters that represent the performance of the components of the network infrastructure. The term network infrastructure refers to all the computing devices, servers, or clients connected to the Internet backbone, participating in the searching operation. In addition, in FIG. 7, the servers have network interfaces and user interfaces that are similar to those shown in FIG. 5, and can be wireless, wireline, optical or comprise other connectivity. However, these are not specifically shown in FIG. 7 for simplicity sake.

Figure 8:
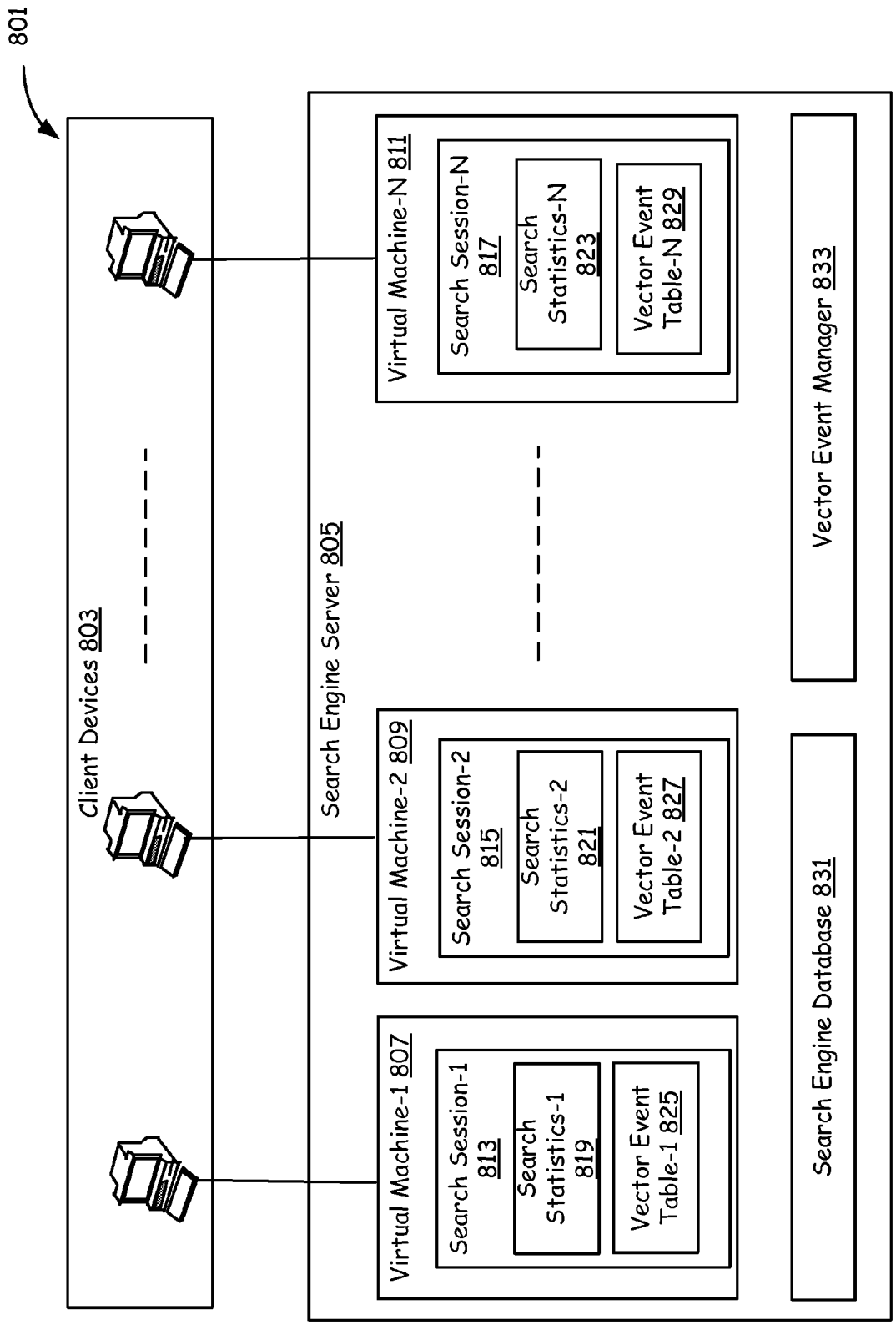
FIG. 8 is a system diagram illustrating an instance of concurrent search sessions performed by a plurality users on respective client devices logged onto one or more search engine servers, connected to a plurality of web servers.

FIG. 8 is a block diagram 801 illustrating an instance of concurrent search sessions performed by a plurality of users on respective client devices 803 logged onto a search engine server 805 (one or more), randomly connecting to a plurality of web servers. In one embodiment, in order to implement security features, for each search session, during concurrent search sessions, a virtual machine concept is followed. This protects from any malicious or unintentional intervention of one search session over another search session.

In one embodiment, there are as many instances of the search engine as that of the number of the virtual machines that are concurrently running. Each of the search sessions is independent within the domain of the virtual machine. A virtual machine 807-811 is a user environment created by the Operating System (OS) of the search engine server for each user; so that the user feels that he is independently working on the search engine server absent any other users. Each session 813-817 is independently generating the search session statistics, desirability data, and formatting it in the form of a vector event and storing into the vector event table for that user's search results and search operations. Finally all the vector event tables 825-829 are saved into the search engine database 831. The vector event manager 833 compiles all the vector event table statistics, and generates the performance statistics, a metric for each of the entities that are involved in the search operations.

An instance of concurrent search sessions performed by a plurality of users are performed on respective client devices 803 logged onto a search engine server 805, and the search engine server 805 randomly is connected to a plurality of web servers 723 to 727 of FIG. 7. Search operations are initiated by entering the search string via the user on the client devices 803. In one embodiment, a plurality of the client devices 803 will logon to a search engine server through the corresponding client network browser (taught herein), wherein the search engine will start a search session, within a virtual machine domain 807-811, protecting the session from each other's intervention. A plurality of the virtual machines 807 to 811, with concurrent sessions comprising a plurality of search sessions 813 to 817 are running on the search engine server. A plurality of the search session statistics 819 to 823 are gathered by the components of the session manager 223 as described earlier (see FIG. 2). A plurality of the vector event tables 825 to 829 are concurrently generated for all the simultaneous sessions and stored in the search engine database 831. The vector event manager 833 computes performance statistics using a plurality of the vector event tables 825 to 829. The performance statistics is in the form of performance index on a number scale against each of the performance parameters of interest. Examples of performance parameters are webpage access speed from a web server, webpage quality, webpage delivery format, etc. In addition, in FIG. 8, the server(s) and virtual machines have access to network interfaces and/or user interfaces that are similar to those shown in FIG. 5, and can be wireless, wireline, optical or comprise other connectivity. However, these components are not specifically shown in FIG. 7 for simplicity sake.

Figure 9:
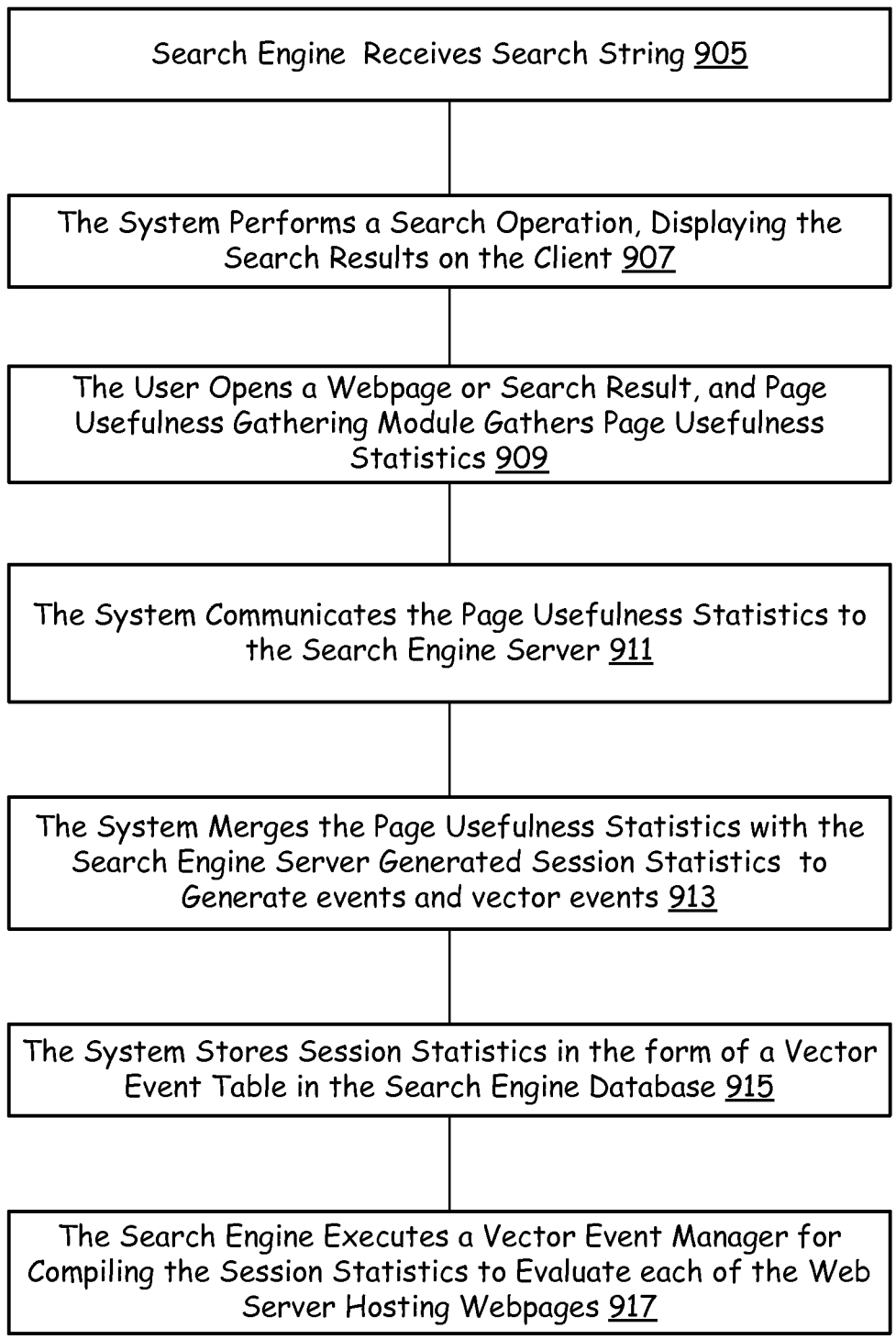
FIG. 9 is a flowchart illustrating the operations performed by a search engine supported by a vector event manager during a search and browse operation that collects various webpage usefulness statistics.

FIG. 9 is a flowchart illustrating the operations 901 performed by the search engine supported by a vector event manager 833 (see FIG. 8) during a search and browse operation, collecting the webpage usefulness statistics (see FIG. 6). Typically during a search operation, a search engine will be opened in a network browser on a client device. A search string will be entered in the search field of the search engine in a step 905. The search engine server will search for the web pages containing the search string or data correlating thereto, wholly or partly, then gather all the page links for search results, and list them in the search engine window in the client device (see device 103 in FIG. 1, for example). The user opens a page of his choice and starts browsing through it. The page usefulness statistics monitor (see FIG. 6) starts automatically gathering the page usefulness statistics as explained previously.

The extracted page usefulness statistics will be communicated to the session manager module of the search engine (see FIG. 5) in a step 911. There are other components of the statistics that the session manager may assemble together, such as previous session statistics for that link, search, or user and other web server specific information for example webpage access time, webpage format, etc., information when the webpage is read from the web server database. All these components of statistics are assembled together, to create a single entity of metadata called an "event," herein (see FIGS. 7-8).

When the events are associated with their link (URL) information, then it is called herein a "vector event." A sequential assemblage of all the vector events pertaining to a complete search session results in a vector event table is then created and stored per step 915. In accordance with the present invention, a search engine module called a "vector event manager" (see FIGS. 7-8) compiles a plurality of the vector event tables that are stored in the search engine database, resulting in the computation of the statistical parameters used by the server. The computed statistical parameters are a direct measure of performance of the Internet infrastructure components primarily, web servers, clients, search engine algorithms, etc. These statistical parameters can be used by IT experts, engineers, or the system itself to track and improve the performance of the Internet resources available for search per a step 917.

The operations performed by the search engine 125 of FIG. 1 are supported by a vector event manager 123 of FIG. 1 during a search and browse operation, allowing the collection of the webpage usefulness statistics. Upon opening the search engine in the network browser of client device, the search engine receives search string at a step 905. The search engine performs searching to find search result pages and displays them in the search engine window (of the network browser) of the client device at a step 907. Subsequently, the user opens a webpage and the page usefulness gathering module/monitor gathers page usefulness statistics at a step 909. The page usefulness statistics will be communicated to the search engine server (session manager module components) at a step 911. The session manager module component merges the page usefulness statistics with the search engine server generated session statistics to generate the webpage events. The search engine further associates the events with their link (URL) information, resulting in "vector event" and gathers all the vector events together to generate the vector event table at steps 913 and 915. The engine computes statistical parameters using a plurality of the vector event tables stored in the search engine database at step 917. The statistical parameters gathered per the step 917 may be used as a direct measure of performance of the Internet infrastructure components.

Figure 10:
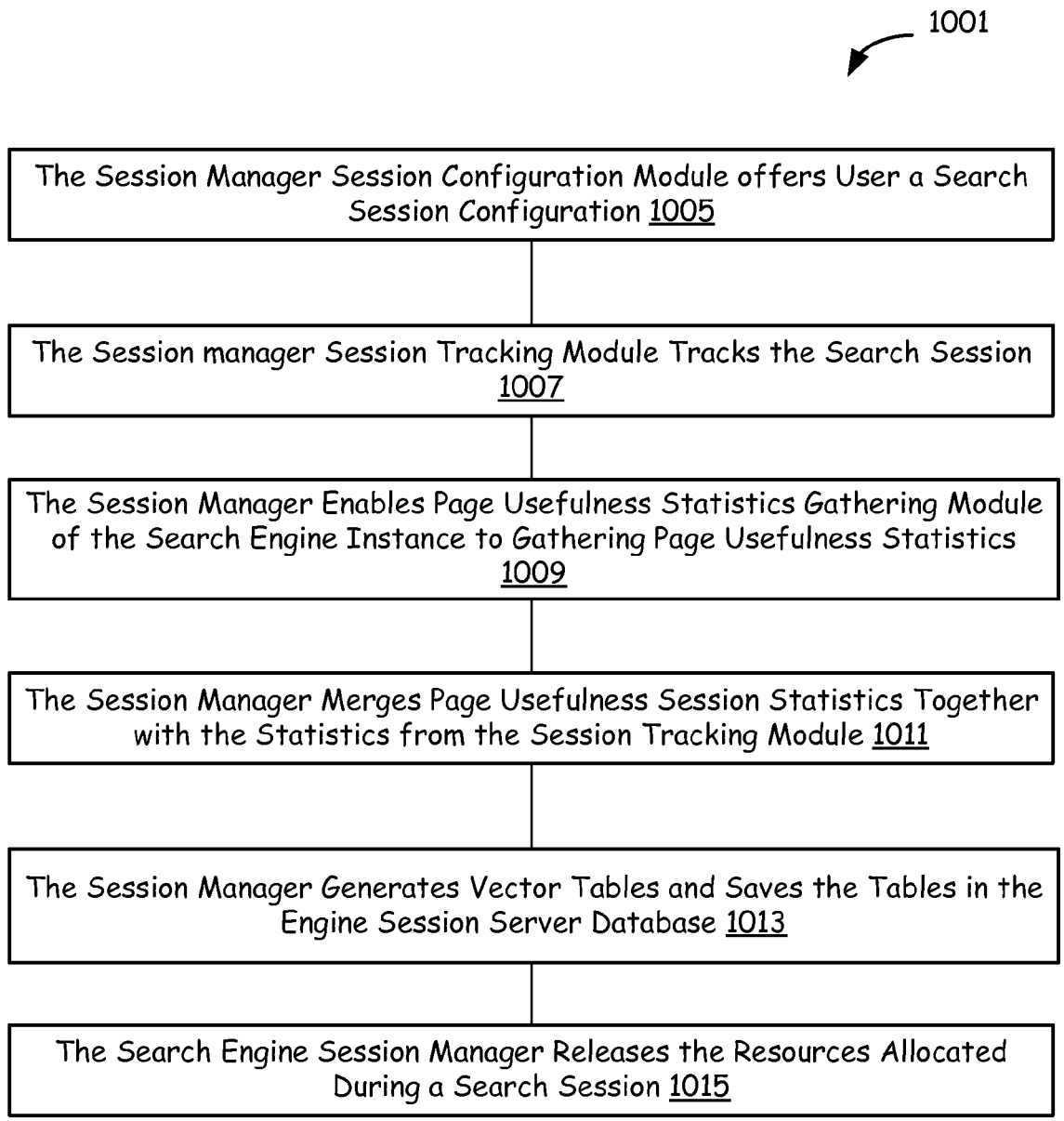
FIG. 10 is a flowchart illustrating the operation of a search engine session manager during a search and browse operation that supports the session statistics gathering.

FIG. 10 is a flowchart illustrating the operation of a search engine session manager (see manager 115 of FIG. 1) during a search and browse operation supporting the session statistics gathering. A session manager manages the search session from the step of retrieving the search statistics from the client device and the web server until the final step of generating the vector event table.

The session configuration module (see FIG. 3) and the session tracking module (see FIG. 4) are the two main components of the session manager (see FIG. 2) whose functionality is explained earlier herein. A plurality of the vector event tables (see FIGS. 7-8) generated during a concurrent search session is considered as the input to the vector event manager 123 of FIG. 1, and this functionality is explained in detail in earlier paragraphs.

A session configuration 1001 is done for a search session using the session configuration module at a step 1005. The session module performs the tracking of the entire session and gathers the session statistics at a step 1007. In one embodiment, session manager enables a page usefulness statistics-gathering module of the search engine instance for gathering page usefulness statistics at a step 1009 (see FIG. 6).

Further, the session manager merges page usefulness session statistics with the statistics from the session tracking module at a step 1011. Session manager generates vector tables and saves this data in the engine session server database in a step 1013. The search engine session manager components releases the resources allocated during a search session in a step 1015.

As one of ordinary skill in the art will appreciate, the terms "operably coupled" and "communicatively coupled," as may be used herein, include direct coupling and indirect coupling via another component, element, circuit, or module. For indirect coupling, the intervening component, element, circuit, or module may or may not modify the information of a signal and may adjust its current level, voltage level, and/or power level. As one of ordinary skill in the art will also appreciate, inferred coupling (i.e., where one element is coupled to another element by inference) includes direct and indirect coupling between two elements in the same manner as "operably coupled" and "communicatively coupled." Different connectivity from that shown in the figures is possible, as for the most part, many of the components and/or software subroutines taught herein communicate with one another either directly or indirectly.

The present embodiments have also been described above with the aid of method steps illustrating the performance of specified functions and relationships thereof. The boundaries and sequence of these functional building blocks and method steps have been defined on way herein for convenience of description. Alternate boundaries and sequences can be defined so long as the specified functions and relationships are appropriately performed. Any such alternate boundaries or sequences are thus within the scope and spirit of the claimed invention.

The present embodiments have been described above with the aid of functional building blocks illustrating the performance of certain significant functions. The boundaries of these functional building blocks have been defined a specific way for convenience of description. Alternate boundaries could be defined as long as the certain significant functions are appropriately performed. Similarly, flow diagram blocks may also have been specifically defined a certain way herein to illustrate certain significant functionality. To the extent used, the flow diagram block boundaries and sequence could have been defined otherwise and still perform the certain significant functionality. Such alternate definitions of both functional building blocks and flow diagram blocks and sequences are thus within the scope and spirit of the claimed invention.

While it is taught herein that a user on a client device initiates a search, it is important to note that other search origins other than a user or a client device exist. Other servers, an artificially intelligence system, a group of users, or other search origins may input a search into a system and start the search processing taught herein. Therefore, search origins or client device sources are users, specific searches, computers, IP destinations, or other object, people, groups, or destinations can start searches and be search origins.

One of average skill in the art will also recognize that the functional building blocks, and other illustrative blocks, modules and components herein, can be implemented as illustrated or by discrete components, application specific integrated circuits, processors executing appropriate software and the like, or any combination thereof.

Moreover, although described in detail for purposes of clarity and understanding by way of the aforementioned embodiments, the present invention is not limited to such embodiments. It will be obvious to one of average skill in the art that various changes and modifications may be practiced within the spirit and scope of the invention, as limited only by the scope of the appended claims.

What is claimed is:

1. A method for performing searches using a search engine server, wherein the method evaluates session statistics to improve a search performance of the search engine server over time, the method comprising the steps of:
    receiving a search string from external to the search engine server, each search string corresponding to a specific client device source;
    performing a search operation and outputting search operation information intended for presentation to a user at a specific client device source via a communication interface;
    gathering page usefulness statistics back from the client device source via the communication interface, the page usefulness statistics being useful to the search engine server in determining what additional search results are of interest to the user;
    merging the page usefulness statistics within the search engine server with other generated server session statistics using processing circuitry;
    appending current session statistics into a webpage vector event table configured to store session statistics for many different search operations involving many different users over a period of time; and
    executing a vector event manager configured to compile the session statistics gathered in the vector event table, the search engine server configured to use the session statistics for many different search operations involving many different users over a period of time to evaluate search engine server performance to improve the quality of search results provided to users in response to search operations.

2. The method of claim 1, wherein the step of receiving a search string comprises receiving many search strings from many clients that are performing a plurality of search operations simultaneously and wherein the session statistics are used over many different user search operations to tune the search engine server for improved search operation over time.

3. The method of claim 2, wherein many clients are performing search operations simultaneously, each client starting a search operation by entering a search string of their own, and wherein there is one virtual machine search session existing on the search engine server for each client that is performing search operations and wherein the search engine sever gathers the search session statistics for each of the searched and browsed web pages within each virtual machine that corresponds to each client.

4. The method of claim 1 wherein the step of appending current session statistics into the webpage vector event table comprises updating the vector event table with respective web pages from the search engine database and appending desirability data and current session statistics related to the respective web pages to the vector event table.

5. The method of claim 1 wherein the step of executing the vector event manager for compiling the session statistics gathered in the vector event table comprises the computation of some useful statistics for rating the usefulness of each of the search results via vector event table contents.

6. A search engine server that supports searching of web content, the Search Engine Server comprising:
    a communication interface;
    memory; and
    processing circuitry communicatively coupled to the communication interface and to the memory and configured to:
        receive a search string via the communication interface that corresponds to a specific client device source;
        perform a search operation using the search string;
        output search operation information via the communications interface intended for presentation to a user at the specific client device source;
        gather page usefulness statistics from the client device source via the communication interface, the page usefulness statistics being useful in determining what additional search results are of interest to the user;
        merge the page usefulness statistics with session statistics;
        append the session statistics into a webpage vector event table configured to store session statistics for many different search operations involving many different users over a period of time; and
        execute a vector event manager configured to compile the session statistics gathered in the vector event table, to use the session statistics for many different search operations involving many different users over a period of time to evaluate search performance to improve the quality of search results provided to users in response to search operations.

7. The search engine server of claim 6, wherein the processing circuitry is configured to service search strings from many clients to perform a plurality of search operations simultaneously and use the session statistics over many different user search operations to tune the search engine server for improved search operation over time.

8. The search engine server of claim 6, wherein the processing circuitry is configured to service search strings from many clients to perform a plurality of search operations simultaneously, each client starting a search operation by entering a search string of their own, and wherein there is one virtual machine search session existing on the search engine server for each client that is performing search operations and wherein the search engine sever gathers the search session statistics for each of the searched and browsed web pages within each virtual machine that corresponds to each client.

9. The search engine server of claim 6, wherein the search engine server is configured to append session statistics into the webpage vector event table by updating the vector event table with respective web pages from the search engine database and appending desirability data and current session statistics related to the respective web pages to the vector event table.

10. The search engine server of claim 6, wherein search engine server is configured to compile compute useful statistics for rating the usefulness of each of the search results via vector event table contents.

* * * * *